United States Patent [19]

Knobbe

[11] Patent Number: 5,196,282

[45] Date of Patent: Mar. 23, 1993

[54] GLASSY OXIDE NETWORK PASSIVATION OF DICHROMATED GELATIN HOLOGRAMS

[75] Inventor: Edward T. Knobbe, Playa Del Rey, Calif.

[73] Assignee: Hughes Aircraft Company, Los Angeles, Calif.

[21] Appl. No.: 552,716

[22] Filed: Jul. 16, 1990

[51] Int. Cl.$^5$ .......................... G03C 1/66; G03C 9/08
[52] U.S. Cl. ........................................ 430/2; 430/1; 430/289
[58] Field of Search ................ 430/289, 2, 1

[56] References Cited

U.S. PATENT DOCUMENTS 4,808,500  2/1989  Wreede et al. .................... 430/2 X

FOREIGN PATENT DOCUMENTS 2221325  1/1990  United Kingdom .................. 430/2

Primary Examiner—Cynthia Hamilton
Attorney, Agent, or Firm—L. A. Alkov; W. K. Denson-Low

[57] ABSTRACT

A passivated dichromated gelatin film in which the film includes a glassy oxide network to provide passivation and structural strengthening. The glassy oxide network is formed simultaneously with the gelatin formation via a sol-gel process.

17 Claims, No Drawings

GLASSY OXIDE NETWORK PASSIVATION OF DICHROMATED GELATIN HOLOGRAMS

BACKGROUND OF THE INVENTION

1. Field of the Invention

The present invention relates generally to dichromated gelatin (DCG) used in the fabrication of holographic optical elements. More particularly, the present invention relates to the use of a glass network structure within the dichromated gelatin to provide structural stability and passivation to the holographic gelatin film.

2. Description of Related Art

Dichromated gelatin has been used for at least ten years as the material of choice for recording high performance holographic optical elements or holograms. A continuing problem with dichromatic gelatin is that the material is extremely sensitive to temperature, pressure, processing parameters and water vapor. Much of the gelatin's sensitivity is due to a lack of structural integrity in the colloidal film.

In order to compensate for the gelatin's inherently weak structure and susceptibility to water vapor, etc., the gelatin films are generally isolated and supported between gas impermeable barriers. Typically, the dichromated gelatin films are laminated between microsheets of glass or plastic. In addition, chemical hardening of techniques and porous glass monoliths containing diffused monomeric recording materials have been used. However, microsheet laminates are difficult to work with, are mechanically unstable and are incompatible when curved substrate configurations are required. Further, performance degradation generally occurs due to index mismatches among the various laminate layers required to protect the dichromated gelatin film.

Chemical hardening has been somewhat successful in passivating the gelatin film against attach by moisture, etc. However, chemical hardening does not yield films which are sufficiently hardened to be of much practical use. Further, chemical hardening tends to degrade performance of highly efficient holograms. The use of porous glass structures to reinforce the dichromated gelatin is limited by the amount of photopolymerizable material which can be introduced by diffusion into the porous glass network. Generally, only 15 to 25 weight percent gelatin can be introduced by diffusion into such porous glass networks. In addition, such porous glass networks cause unacceptable light scatter.

There presently is a need to provide a means for passivating dichromated gelatin films to reduce their susceptibility to temperature, pressure, processing parameters and water vapor. In accomplishing such gelatin passivation, it is also necessary to provide a relatively lightweight, low cost structure which is sufficiently strong to be used in visor displays, head up displays, and head down displays using high gain holographic diffusing screens. Such passivation of the dichromated gelatin hologram should also be simple and efficient so that it can be used in the mass production of low cost holographic displays.

SUMMARY OF THE INVENTION

In accordance with the present invention, it was discovered that dichromated gelatin can be passivated to reduce its susceptibility to temperature, pressure, processing parameters and water vapor by impregnating the gelatin with a glassy oxide network. The invention is based upon the discovery that metal alkoxides can be added to the aqueous gelatin solution during film formation to provide formation of a glassy oxide network within the final dichromated gelatin. The formation of the glassy oxide network occurs by way of a sol-gel glass synthesis.

As a feature of the present invention, it was discovered that the sol-gel synthesis of a glassy oxide network simultaneously with the formation of the dichromated gelatin film results in a passivated gelatin film having increased structural strength and resistance to temperature, pressure, processing parameters and water vapor. The formation of the glassy oxide network via the sol-gel process obviates those problems experienced with prior techniques involving diffusion of gelatin into a previously formed porous glass network.

As a feature of the present invention, the impregnation of the dichromated gelatin film via the sol-gel process is a simple and efficient means for passivating the dichromated gelatin film which is well suited for mass production of low cost holographic elements.

As another feature of the present invention, tetraethoxy silane is metal alkoxide which is especially well suited for producing a glassy oxide network that increases the structural strength of the dichromated gelatin film and provides passivation of the film without adversely affecting the film's holographic properties.

The above described and many other features and attendant advantages of the present invention will become better understood by reference to the following detailed description.

DESCRIPTION OF THE PREFERRED EMBODIMENTS

Dichromated gelatin holograms (DCG) posses outstanding clarity, are essentially scat+er free, and develop relatively large index variations wnen holographically exposed. DCG is one of the most flexible and widely used of the various holographic recording materials. In recent years, hundreds of patents and other articles concerning DCG holograms have been published. However, as mentioned previously, DCG films are very fragile and therefore cannot be easily incorporated into many potentially important applications. Further DCG is not well suited for production techniques requiring elevated temperature, pressure or the presence of water vapor during the fabrication of the film and/or display configuration.

The present invention provides a means to passivate DCG films in order to render them useful in applications and/or fabrication processes wherein elevated temperatures and pressures may occur or where water vapor is present. For the purposes of the following description, the term "passivated" will mean the reduction in the sensitivity of DCG to temperature, pressure and/or water vapor. In addition, the term "passivation" will include strengthening of the inherently weak DCG film.

Passivation of the DCG film in accordance with the present invention is provided by impregnating the gelatin film with a sufficient amount of a glassy oxide network to provide a passivated dichromated gelatin film having increased structural strength. The invention involves utilizing the solution chemistry technique for making glassy inorganic materials known as sol-gel. This chemical method provides room temperature synthesis of oxide glasses. Sol-gel processes in general are described in detail in "Proceedings of the Fourth Intl.

Conf. Ultrastructure Processing," J. D. MacKenzie and D. R. Ulrich, eds., Wiley (1988).

The sol-gel process involves a hydrolysis and condensation reaction of organometallic precursors to form a polymerized oxide glass. The hydrolysis step involves hydrolyzing the organometallic compound in water to form a hydroxylated intermediate. The hydroxylated intermediate then undergoes polycondensation to form the polymerized oxide glass. Sol-gel processes and procedures are well known in the art. For the present invention, the organometallic compound used to form the polymerized oxide glass is preferably a silicon alkoxide. Suitable silicon alkoxides include tetramethoxy silane, and tetraethoxy silane. Tetraethoxy silane is a preferred organometallic.

The formation of passivated DCG is carried out following well-known conventional DCG fabrication procedures. Gelatin, dichromate and water are mixed in conventional proportions for forming the dichromated gel. The dichromate can be added to the film at a later time if desired. In accordance with the present invention, the metal alkoxide is added to the gelatin solution during the initial gelatin formation step. The resulting aqueous gelatin solution is then processed according to conventional procedures to form the DCG film. During the gelatin formation, the metal alkoxide forms the glassy oxide network via the sol-gel process.

In general, the aqueous solution from which the passivated gelatin is prepared will contain between about 5 to 35 weight percent gelatin, 0 to 5 weight percent dichromate (optional) and 0.3 to 30 weight percent metal alkoxide, the balance being made up by water. A preferred solution will contain 15 weight percent gelatin, 0.1 weight percent dichromate and 5 weight percent tetraethoxy silane. In practice, the ammonium dichromate is added to the gelatin film by soaking in a sensitizing solution after the passivated film has dried. Acid or base catalyst, if necessary, will be present in the concentration range of 0–1% (approx.). The DCG film is formed from the aqueous solution according to conventional coating processes wherein the solution is spun or cast onto glass or any other suitable substrate. The particular procedure used in forming the DCG passivated film can be any of the known coating and film formation processes. The resulting gelatin film will contain between about 0.5 to 10 weight percent of the glassy oxide network. The film is then further treated with dichromates if necessary. Gelatin films containing up to 50 weight percent are possible.

Examples of practice are as follows:

EXAMPLE 1

An aqueous solution containing 10 grams gelatin, 0.01 gram of HCl catalyst and 10 grams tetraethoxy silane in 200 ml of water was prepared. The solution was mixed for approximately 15 minutes until the solution became homogeneous. The solution was then cast onto a glass substrate at a temperature of 60° C. under an air atmosphere. The films were dried for 24 hours in air prior to sensitization, which was accomplished by soaking the plates in a 1M aqueous solution of ammonium dichromate for 30 seconds. The resulting gel was impregnated with a glassy oxide network which greatly increased the structural strength and integrity of the film. In addition, the film performed acceptably as a hologram.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. A passivated dichromated gelatin film adapted for use in a hologram, said passivated film comprising a gelatin film impregnated with a sufficient amount of glassy oxide network to provide a passivated dichromated gelatin film having increased structural strength.

2. A passivated dichromated gelatin film according to claim 1 wherein the amount of said glassy oxide network impregnated in said gelatin film is between 0.1 to 50 weight percent of said passivated dichromated gelatin film.

3. A passivated dichromated gelatin film according to claim 1 wherein said film is made from an aqueous gelatin solution comprising gelatin, dichromate and metal alkoxide.

4. A passivated dichromated gelatin film according to claim 3 wherein said metal alkoxide is a silicon alkoxide.

5. A passivated dichromated gelatin according to claim 4 wherein said silicon alkoxide is tetraethoxy silane.

6. In a dichromated gelatin film adapted for use in a hologram, wherein said gelatin film is made from an aqueous solution containing gelatin and dichromate and wherein the improvement comprises forming a passivated gelatin film including a glassy oxide network within said gelatin film, said glassy oxide network being formed by a sol-gel process wherein a sufficient amount of a metal alkoxide is added to said aqueous solution during formation of gelatin layer to form said glassy oxide network.

7. An improved dichromated gelatin film according to claim 6 wherein the amount of metal alkoxide added to said aqueous solution of gelatin and dichromate is between about 0.3 weight percent and 30 weight percent of the total aqueous solution.

8. An improved dichromated gelatin film according to claim 7 wherein said metal alkoxide is a silicon alkoxide.

9. An improved dichromated gelatin film according to claim 8 wherein said silicon alkoxide is tetraethoxy silane.

10. A method for making a passivated dichromated gelatin film comprising the steps of:
reacting dichromate, gelatin, catalyst and a metal alkoxide to form an aqueous gelatin solution;
forming said aqueous gelatin solution into a passivated dichromated gelatin film which includes a glassy oxide network formed by said metal alkoxide.

11. A method according to claim 10 wherein said aqueous solution contains between about 5 to 35 weight percent gelatin, 0 to 1 weight percent catalyst and 0.3 to 30 weight percent metal alkoxide.

12. A method according to claim 10 wherein said metal alkoxide is a silicon alkoxide.

13. A method according to claim 12 wherein said silicon alkoxide is tetraethoxy silane.

14. A method according to claim 12 wherein said silicon alkoxide is tetraethoxy silane.

15. A method according to claim 10 wherein said aqueous solution contains between about 5 to 35 weight percent gelatin and 0.3 to 30 weight percent metal alkoxide.

16. A method for making a passivated dichromated gelatin film comprising the steps of:
reacting gelatin, dichromate and a metal alkoxide to form an aqueous gelatin solution; and
forming said aqueous gelatin solution into a passivated dichromated gelatin film which includes a glassy oxide network formed by said metal alkoxide.

17. A method according to claim 16 wherein said metal alkoxide is a silicon alkoxide.

* * * * *

UNITED STATES PATENT AND TRADEMARK OFFICE
CERTIFICATE OF CORRECTION

PATENT NO. : 5,196,282
DATED : March 23, 1993
INVENTOR(S) : Edward T. Knobbe

It is certified that error appears in the above-identified patent and that said Letters Patent is hereby corrected as shown below:

IN THE CLAIMS, delete Claims 14 through 17 as they appear (Column 4, line 63 through Column 6, line 5), and insert therefor the following claims:

--14. A method for making a passivated dichromated gelatin film comprising the steps of:
    reacting gelatin, dichromate and a metal alkoxide to form an aqueous gelatin solution; and
    forming said aqueous gelatin solution into a passivated dichromated gelatin film which includes a glassy oxide network formed by said metal alkoxide.

15. A method according to claim 14 wherein said aqueous solution contains between about 5 to 35 weight percent gelatin and 0.3 to 30 weight percent metal alkoxide.

16. A method according to claim 14 wherein said metal alkoxide is a silicon alkoxide.

17. A method according to claim 16 wherein said silicon alkoxide is tetraethoxy silane.

Signed and Sealed this

Fourth Day of April, 1995

*Attest:*

BRUCE LEHMAN

*Attesting Officer*       *Commissioner of Patents and Trademarks*